United States Patent
Balasubramanian et al.

(10) Patent No.: US 9,563,650 B2
(45) Date of Patent: Feb. 7, 2017

(54) MIGRATING FEDERATED DATA TO MULTI-SOURCE UNIVERSE DATABASE ENVIRONMENT

(71) Applicants: Makesh Balasubramanian, Bangalore (IN); Tejram Jagannath Sonwane, Bangalore (IN)

(72) Inventors: Makesh Balasubramanian, Bangalore (IN); Tejram Jagannath Sonwane, Bangalore (IN)

(73) Assignee: SAP SE, Walldorf (DE)

( * ) Notice: Subject to any disclaimer, the term of this patent is extended or adjusted under 35 U.S.C. 154(b) by 435 days.

(21) Appl. No.: 14/331,878

(22) Filed: Jul. 15, 2014

(65) Prior Publication Data
US 2016/0019242 A1    Jan. 21, 2016

(51) Int. Cl.
G06F 17/30    (2006.01)
G06Q 10/10    (2012.01)

(52) U.S. Cl.
CPC ... *G06F 17/30292* (2013.01); *G06F 17/30917* (2013.01); *G06F 17/30923* (2013.01); *G06Q 10/10* (2013.01)

(58) Field of Classification Search
CPC .............................................. G06F 17/30917
USPC ....................................................... 707/609
See application file for complete search history.

(56) References Cited

U.S. PATENT DOCUMENTS

| | | | |
|---|---|---|---|
| 2013/0282919 A1* | 10/2013 | Richards, III | G06F 9/5072 709/238 |
| 2015/0006490 A1* | 1/2015 | Balasubramanian | G06F 17/30371 707/690 |
| 2015/0293948 A1* | 10/2015 | Balasubramanian | G06F 17/30566 707/809 |
| 2016/0012042 A1* | 1/2016 | Balasubramanian | G06F 17/303 707/809 |

OTHER PUBLICATIONS

Article entitled "How to Convert a Universe to Multi-Source in SAP BusinessObjects B14", by Clariba, dated Apr. 10, 2012.*

(Continued)

*Primary Examiner* — Mahesh Dwivedi
(74) *Attorney, Agent, or Firm* — Fountainhead Law Group P.C.

(57) ABSTRACT

Embodiments relate to reporting data of project artifacts in a multi-source universe database environment. In embodiments, an analytics module is configured to receive as input, data in target tables of a data federator. With reference to a file, the analytics module creates a federated table in a federator layer of an Information Design Tool (IDT) in a multi-source universe database environment. The federator layer may also include data source references, objects, and mapping rules. This migration process allows the IDT to preserve with the federated tables, previously created mapping rules defining the complex logical relationship between the target tables and the underlying database data. These mapping rules are used in creating project-based reports of the federated table data in the multi-source database universe environment. In this manner, data can be migrated to a multi-source database universe, while conserving previous effort to define logical relationships between federated data and the database.

20 Claims, 11 Drawing Sheets

(56) References Cited

OTHER PUBLICATIONS

Article entitled "Best Practices and Methodologies for Upgrading SAP BusinessObjects Enterprise to SAP BusinessObjects Bl 4.0", Copyright 2011.*
Article entitled "Business Intelligence for a Passionate Community", by Vezzosi, dated Sep. 13, 2012.*

* cited by examiner

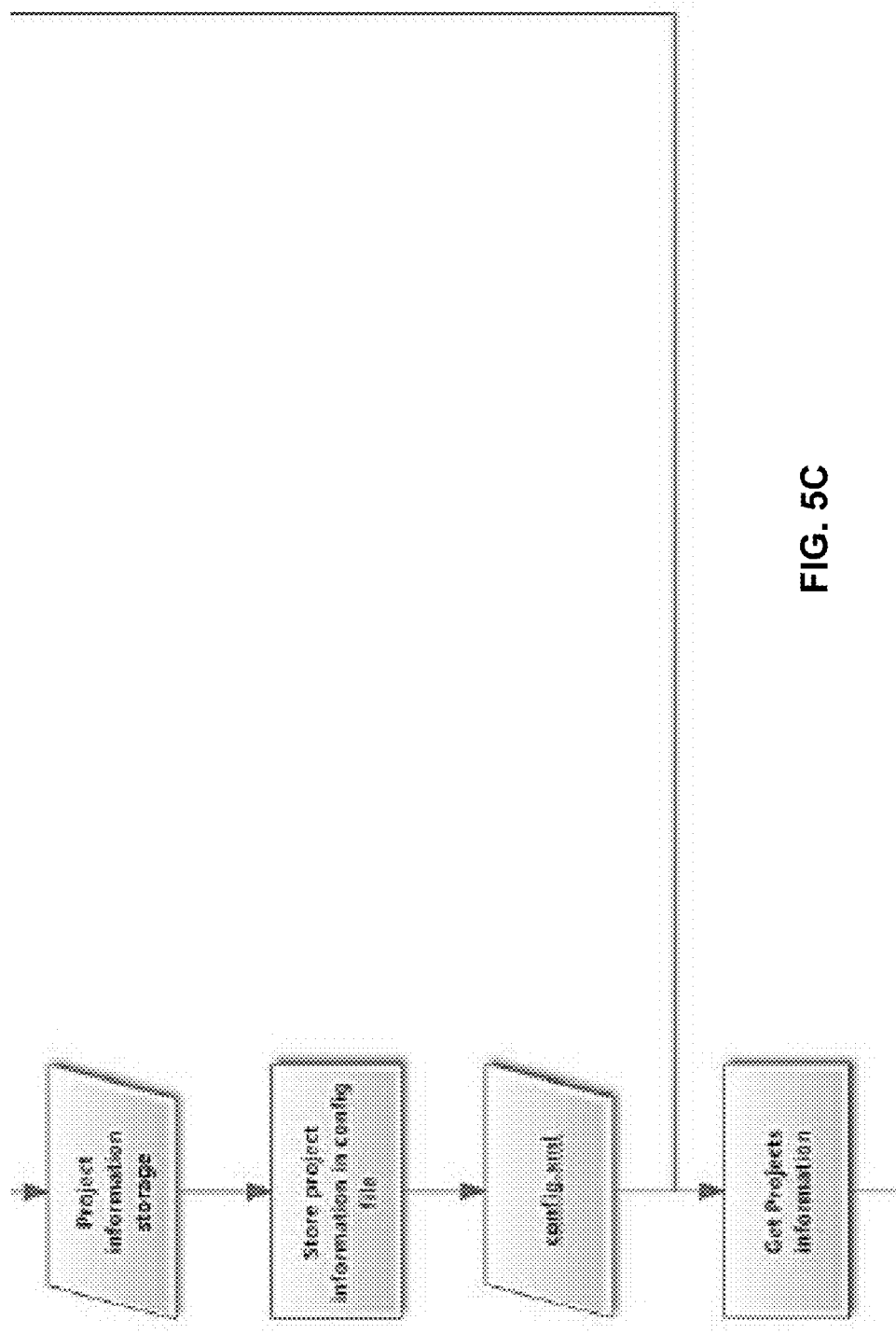

US 9,563,650 B2

MIGRATING FEDERATED DATA TO MULTI-SOURCE UNIVERSE DATABASE ENVIRONMENT

BACKGROUND

Embodiments of the present invention relate to handling data in a database, and in particular to converting federated data from a single-source to a multi-source database environment. Unless otherwise indicated herein, the approaches described in this section are not prior art to the claims in this application and are not admitted to be prior art by inclusion in this section.

Currently, enterprises tend to rely upon reports that are generated from databases having a same structure and organization. Increasingly, however, enterprises may be faced with storing, accessing, and reporting data from across a plurality of different database platforms. One example may arise in a merger/acquisition between different companies. In this type of a scenario, data of the target company that has been federated for purposes of reporting in connection with specific projects, needs to be available to the acquiring company moving forward. That target data, however, may be formatted for reporting according to a database platform that is different from the acquiror's.

The circumstances as have been described above, may call for the ability to rapidly combine data from various formats, in order to furnish reports reflecting data from different database platforms.

SUMMARY

Embodiments relate to reporting data of project artifacts in a multi-source universe database environment. In embodiments, an analytics module is configured to receive as input, data in target tables of a data federator. With reference to a file, the analytics module creates a federated table in a federator layer of an Information Design Tool (IDT) in a multi-source universe database environment. The federator layer may also include data source references, objects, and mapping rules. This migration process allows the IDT to preserve with the federated tables, previously created mapping rules defining the complex logical relationship between the target tables and the underlying database data. These mapping rules are used in creating project-based reports of the federated table data in the multi-source database universe environment. In this manner, data can be migrated to a multi-source database universe, while conserving previous effort to define logical relationships between federated data and the database.

An embodiment of a computer-implemented method comprises causing an analytics module to receive first project data comprising a first target table stored in a data federator, and causing the analytics module to analyze the first project data and identify a first detail comprising a first mapping between the first target table and data of a first source. The analytics module is caused to create a first project as a first federated table in a federator layer of an information design tool. The analytics module is caused to save the first detail in a file. The analytics module is caused to reference the file to create a multi-source database universe including the information design tool, the first source, and a first mapping rule between the first federated table and the first source.

A non-transitory computer readable storage medium embodies a computer program for performing a method comprising causing an analytics module to receive first project data comprising a first target table stored in a data federator, and causing the analytics module to analyze the first project data and identify a first detail comprising a first mapping between the first target table and data of a first source. The analytics module is caused to create a first project as a first federated table in a federator layer of an information design tool. The analytics module is caused to save the first detail in a file. The analytics module is caused to reference the file to create a multi-source database universe including the information design tool, the first source, and a first mapping rule between the first federated table and the first source. The analytics module is caused to analyze the first project data and identify a second detail comprising a second mapping between the first target table and data of the first source. The analytics module is caused to save the second detail in the file. The analytics module is caused to reference the file to create in the multi-source database universe a second mapping rule between the first federated table and the first source.

An embodiment of a computer system comprises one or more processors and a software program executable on said computer system and configured to cause an analytics module to receive first project data comprising a first target table stored in a data federator. The software program is configured to cause the analytics module to analyze the first project data and identify a first detail comprising a first mapping between the first target table and data of a first source. The software program is configured to cause the analytics module to create a first project as a first federated table in a federator layer of an information design tool. The software program is configured to cause the analytics module to save the first detail in an XML file. The software program is configured to cause the analytics module to reference the XML file to create a multi-source database universe including the information design tool, the first source, and a first mapping rule between the first federated table and the first source. The software program is configured to cause the analytics module to analyze the first project data and identify a second detail comprising a second mapping between the first target table and data of the first source. The software program is configured to cause the analytics module to save the second detail in the XML file. The software program is configured to cause the analytics module to reference the XML file to create in the multi-source database universe a second mapping rule between the first federated table and the first source.

An embodiment further comprises causing the analytics module to analyze the first project data and identify a second detail comprising a second mapping between the first target table and data of the first source. The analytics module is caused to save the second detail in the file. The analytics module is caused to reference the file to create in the multi-source database universe a second mapping rule between the first federated table and the first source.

Some embodiments may further comprise causing the analytics module to analyze the first project data and identify second detail comprising a second mapping between a second target table and data of a first source. The analytics module is caused to create a second federated table in the federator layer. The analytics module is caused to save the second detail in the file. The analytics module is caused to reference the file to create in the multi-source database universe a second mapping rule between the second federated table and the first source.

Certain embodiments further comprise causing the analytics module to receive second project data comprising a second target table stored in the data federator, and causing the analytics module to analyze the second project data and identify a second detail comprising a second mapping between the second target table and data of a first source. The analytics module is caused to create a second project as a second federated table in the federator layer of the information design tool. The analytics module is caused to save the second detail in the file. The analytics module is caused to reference the file to create in the multi-source database universe a second mapping rule between the second federated table and the first source.

Particular embodiments further comprise causing the analytics module to receive second project data comprising a second target table stored in different data federator, and causing the analytics module to analyze the second project data and identify a second detail comprising a second mapping between the second target table and data of a second source. The analytics module is caused to create a second project as a second federated table in the federator layer of the information design tool. The analytics module is caused to save the second detail in the file. The analytics module is caused to reference the file to create in the multi-source database universe the second source and second mapping rule between the second federated table and the second source.

Some embodiments may further comprise displaying the first source in a color different from the second source.

In various embodiments the analytics module analyzes the first project data by establishing a connection with a data objects repository.

In certain embodiments the file comprises an XML file.

The following detailed description and accompanying drawings provide a better understanding of the nature and advantages of particular embodiments.

BRIEF DESCRIPTION OF THE DRAWINGS

FIGS. 5A-5D show a more detailed view of the migration process of FIG. 5.

DETAILED DESCRIPTION

Described herein are techniques for migrating federated data from a single-source database environment to a multi-source database environment. As used herein, the term "universe" also refers to the database environment. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to reporting data of project artifacts in a multi-source universe database environment. In embodiments, an analytics module is configured to receive as input, data in target tables of a data federator. With reference to a file, the analytics module creates a federated table in a federator layer of an Information Design Tool (IDT) in a multi-source universe database environment. The federator layer may also include data source references, objects, and mapping rules. This migration process allows the IDT to preserve with the federated tables, previously created mapping rules defining the complex logical relationship between the target tables and the underlying database data. These mapping rules are used in creating project-based reports of the federated table data in the multi-source database universe environment. In this manner, data can be migrated to a multi-source database universe, while conserving previous effort to define logical relationships between federated data and the database.

Figure 1:
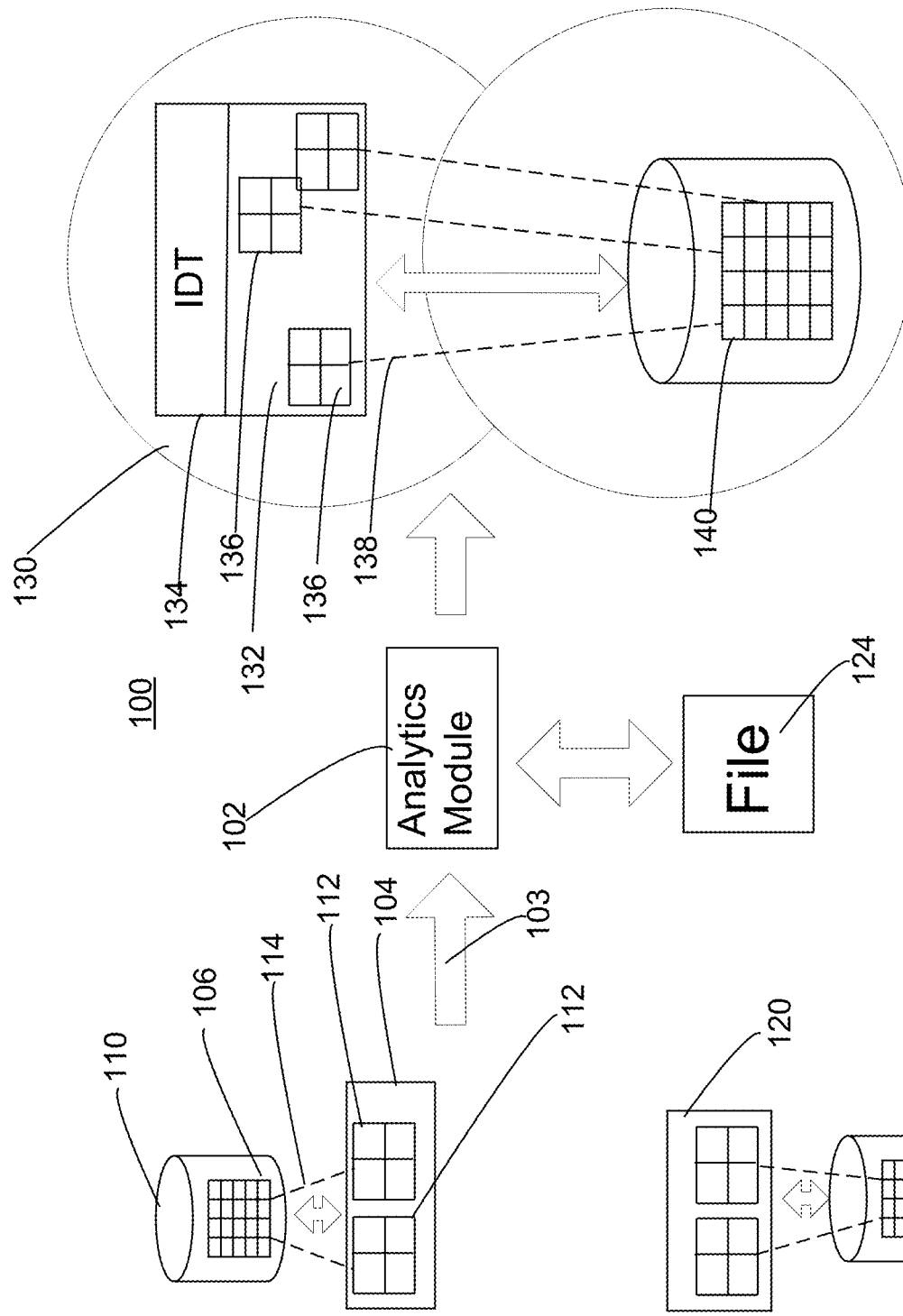
FIG. 1 shows a simplified view of a system according to an embodiment.

FIG. 1 shows a simplified view of a system according to an embodiment. In particular, system 100 comprises an analytics module 102 (also referenced herein as an engine) that is configured to receive as input 103, data collected by a data federator 104 from a database 106. The database may be stored in a non-transitory computer readable storage medium 110.

The data federator 104 may be configured to store specific data from the database as target tables 112. The data of the target tables is relevant to certain projects and hence relied upon in providing reports to the user.

In particular, the target tables are virtual tables that reside inside the data federator. The target tables can be queried by a user at runtime.

Data in the target tables is linked with the data of the underlying database, through mappings 114. These mappings 114 represent complex logical relations typically developed based upon previous manual effort. It is therefore desirable to preserve these mappings and thereby conserve effort and expense, in any migration process.

Specifically, the analytics module 102 is configured to migrate the data federator from a single source database universe, to a multi-source database universe 130. For example, such a multi-source database universe may include data of second data federator 120.

With reference to information stored in a file 124, the analytics module 102 is configured to produce an output 105 that moves the data of the target tables of the data federator, into a federator layer 132 of an Information Design Tool (IDT) 134 of the multi-source database universe. This data migration is performed while preserving the mappings defining the relationships linking the target tables to the data in the underlying database.

Accordingly, FIG. 1 shows the creation of federated tables 136 within the federator layer of the IDT. Such federated tables preserve the complex logic previously relied upon in manually designing the target tables of the data federator.

In particular, FIG. 1 shows the mapping rules 138 providing the logical relationship between the federated tables and the data that is stored (e.g., as tables) in the underlying database 140 of the multi-source universe. The federated tables may be relied upon to provide reports from the IDT regarding specific projects, with the logical connection between the data of the project report and the underlying multi-source database preserved by the mapping rules.

In this manner, embodiments allow generation of a multi-source universe (MSU). The MSU also takes data from multiple sources and shows the unified view. So, the MSU has the capabilities of a data federator and some other additional functionalities. A user can create a project artifact in the IDT which includes data source references, the MSU, business layer files (BLX), target tables, objects, mapping rules, etc.

Figure 2:
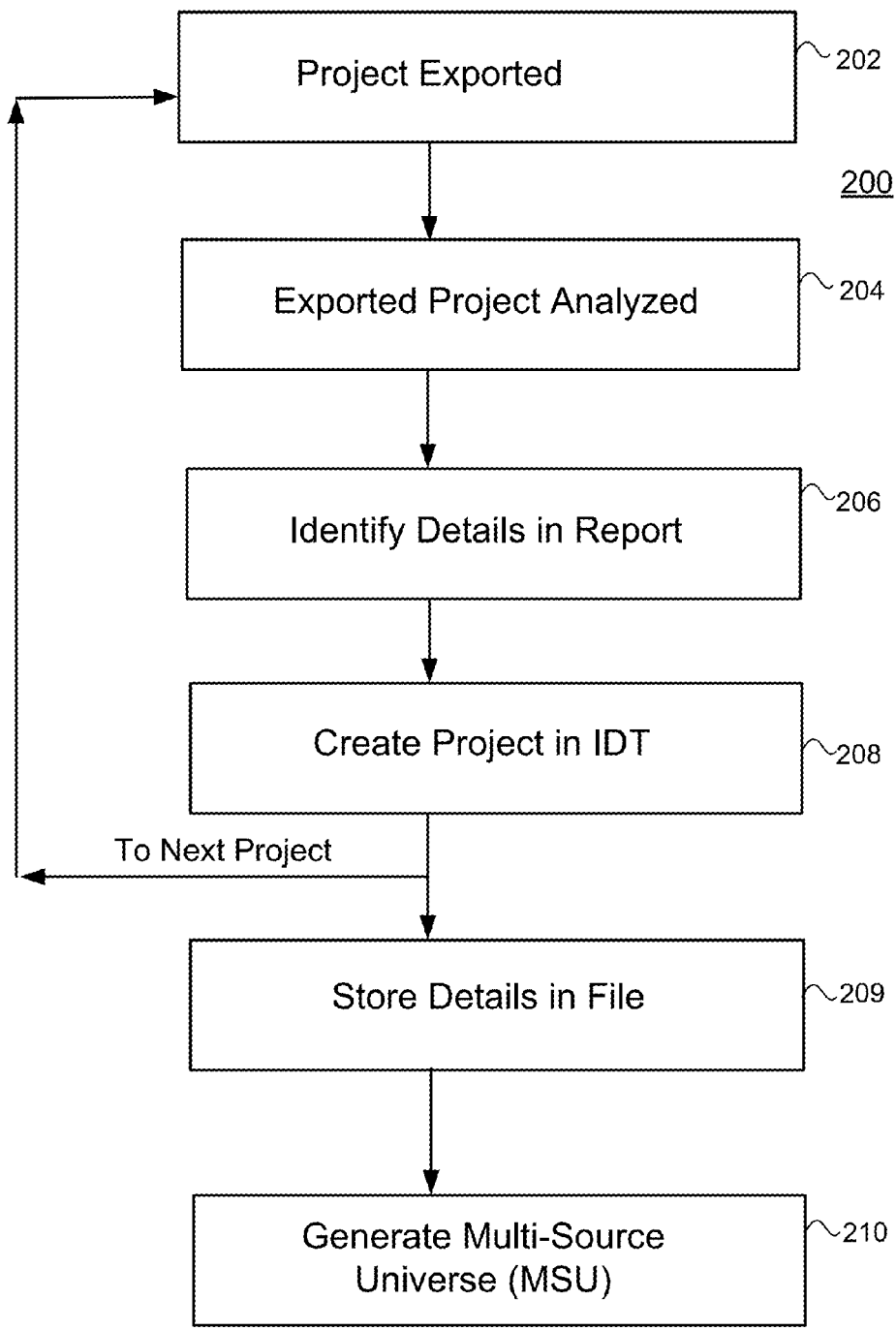
FIG. 2 is a simplified flow diagram of a method according to an embodiment.

FIG. 2 is a simplified flow diagram providing an overview of a conversion process 200 according to an embodiment. In a first step 202, a project comprising a report is exported from the single source database environment in which it was created. This may involve retrieving the project information like project name and project description.

In a second step 204, the exported project is analyzed to identify information that may be required to convert the report into a federation layer of the multi-source universe.

In a third step 206, details of the report are identified utilizing an analysis module. A number of specific details that may be identified according to embodiments, are now described below.

One example of such a detail is the project name as set forth in the data federator. Another detail is a project description.

Another type of detail that may be collected is the identity of the data sources. These may further comprise the connection details used to establish connection with the database of the single-universe environment, as well as selected tables from that database. Other aspects can include the data source mode (either draft or final), and list of tables and views used for target tables.

Another detail comprises those target tables implicated in the project reporting. As mentioned previously, target tables are virtual tables that live inside the data federator. The target tables can be queried at runtime.

Details of target tables may be retrieved from the SSU. Each target table includes a name, a description, and columns Each column of the target table in turn may include a name, a description, a type, a designation as input column, and constraints.

Still another detail that can be identified in this step comprises mapping rules. The mapping rules are identified that link the target table with data source tables. Each mapping rule may have a name, a description, data source tables, relations between data source tables, and links between target table columns and data source columns.

Yet another detail that may be identified during this step are the Joins. These Joins define the relations between the source tables in the underlying single-source universe database, that are selected to define the target table.

A next step 208 shown in the process flow of FIG. 2, is the automatic creation of a project in an information design tool (IDT). Further information regarding this step is provided in the flow chart shown in FIG. 3.

The above steps are repeated to collect details for all projects. In step 209 these details are stored in a file (e.g., XML file) which is an input for the generation of multi-source universes.

A final step 210 shown in the process flow of FIG. 2, is the automatic re-generation of a multi-source universe. Further information regarding this step is provided in the flow chart of FIG. 4.

Figure 3:
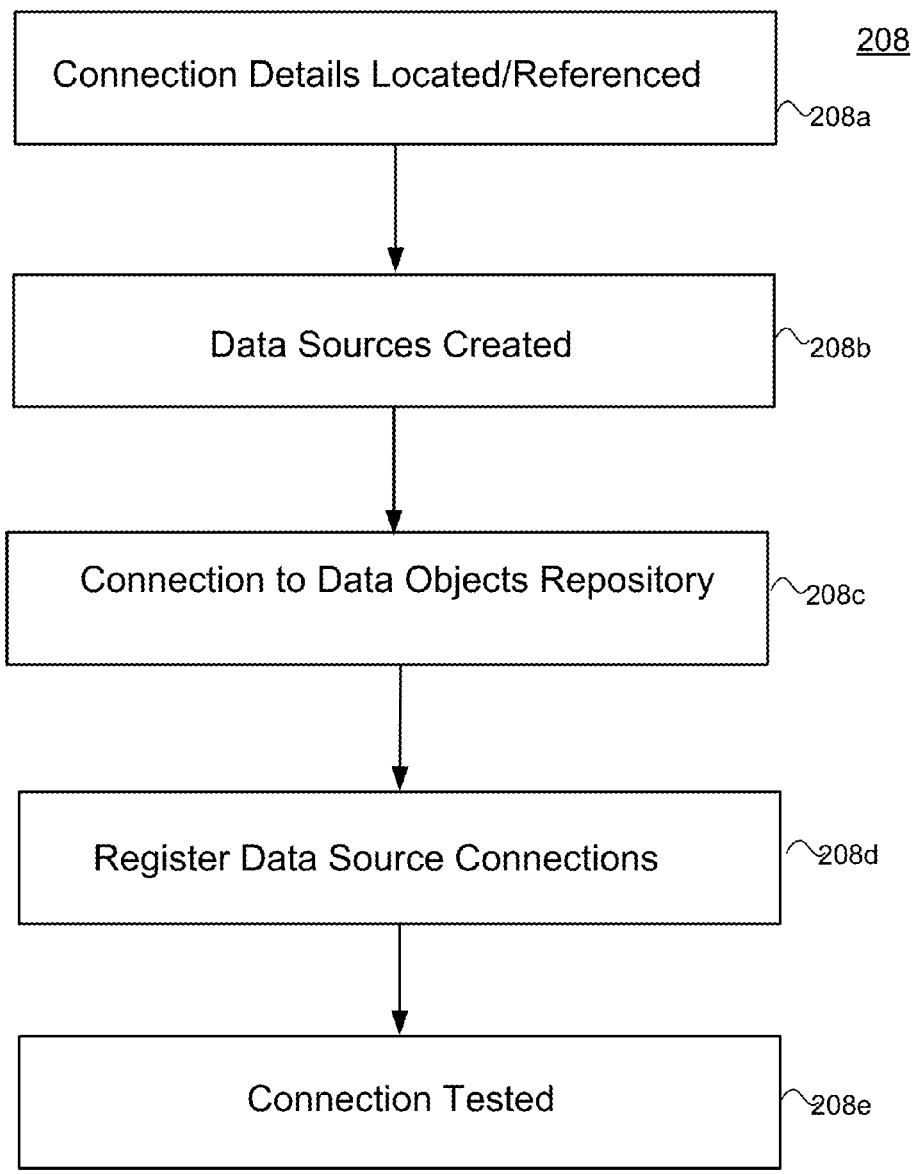
FIG. 3 is a simplified flow diagram showing further aspects of project creation according to an embodiment.

FIG. 3 is a simplified flow chart showing additional information regarding the step 208 of FIG. 2, in which a project is automatically created in an IDT of a multi-source universe. Specifically, in step 208a, connection details previously obtained, are located and referenced.

In step 208b, data sources are created in the IDT using an Application Program Interface (API) that creates connections. Inputs to the API can include but are not limited to, database vendor details and driver details made available as part of the previous step.

In step 208c, connection is made to a data objects repository utilizing the IDT. In one particular example, this data objects repository could comprise a BusinessObjects Enterprise (BOE) repository available from SAP AG of Walldorf, Germany.

In step 208d, if mentioned data sources are in a later stage of the data federator project, then respective data source connections from the IDT in the data objects repository are registered.

In step 208e, the connection and a request for password are tested. The password is entered and the connection registered in the repository.

Figure 4:
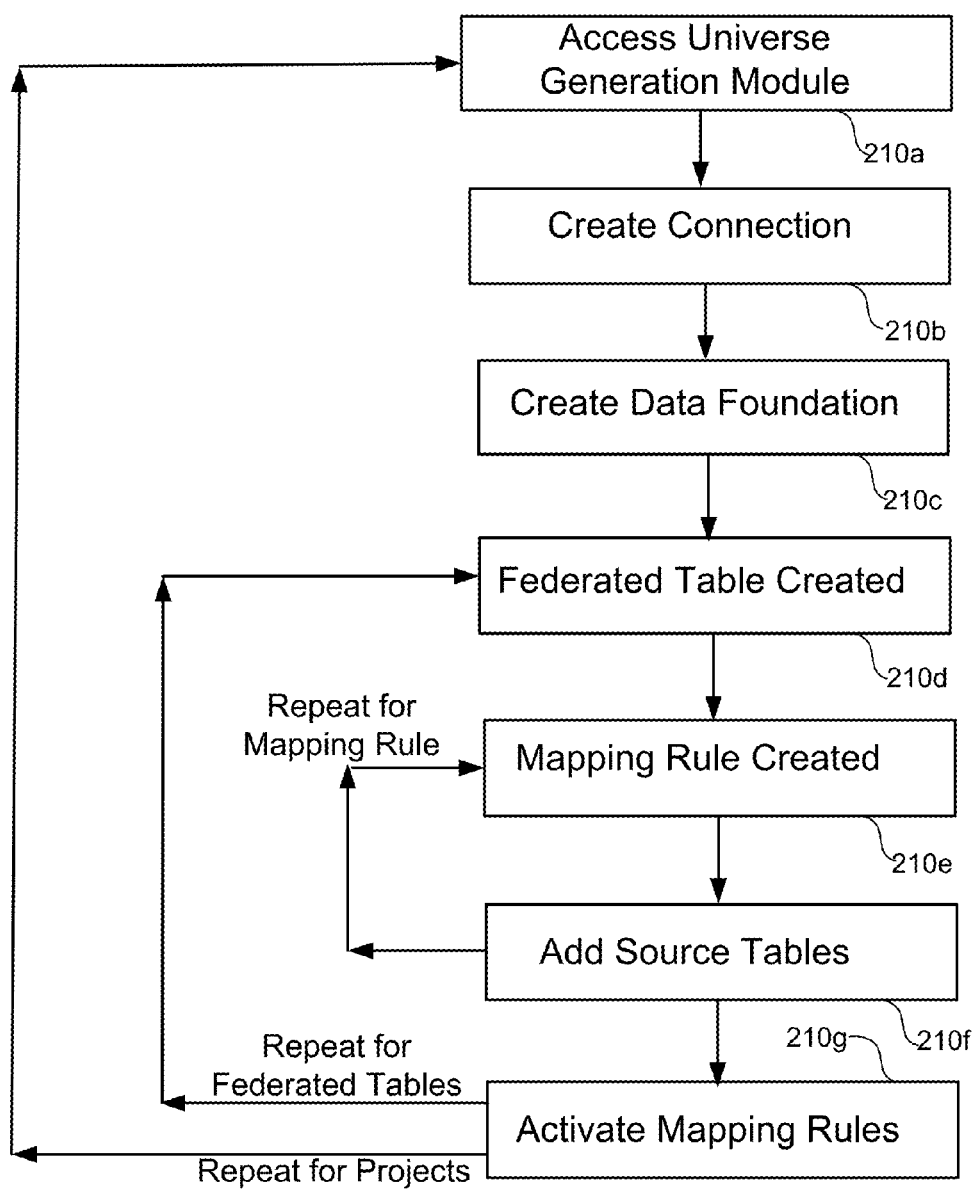
FIG. 4 is a simplified flow diagram showing further aspects of universe creation according to an environment.

FIG. 4 is a simplified flow chart showing additional information regarding the step 210 of FIG. 2, in which a multi-source universe is automatically regenerated. In this process, the database objects (table, view), joins, and database vendor specific syntax used in objects is determined by analyzing the universe.

In a first step 210a, an automatic universe generation module is accessed. This universe generation module reads the project information from the XML file. It creates the project in IDT.

In a second step 210b, the universe generation module creates a connection (e.g., .cnx) in the IDT based on the details mentioned in the XML file. If the project in the data federator of the single-source universe was in final mode than it stores this connection (e.g., .cnx) to the business objects BOE repository and creates shortcut of stored connection (.cns) in the IDT project. This step is then repeated in order to create all connections.

In a third step 210c, this module creates a multi-source universe, as a data foundation. The universe creation module adds stored connections (e.g., .cns) to data sources which have been created in the previous step 208b of the process flow of FIG. 3. In certain embodiments, the identity of various data sources can be differentiated through the use of different colors.

In a fourth step 210d, using target table details and mapping rule details fetched from the file (e.g., XML file) of the previous step 208 of FIG. 2, a federated table is created in the federation layer that is a part of the multi-source universe. The schema of the federated table and the target table may be the same.

In a fifth step 210e, mapping rules for the federated table are created, again using the details previously captured in the previous step 208 of the process flow of FIG. 2. Mapping rule details of the federator table of the federator layer, correspond to the mapping rule details of the target table.

In a sixth step 210f, source tables are added in the mapping rule. A relationship between the source tables is defined. The federated table columns are linked with the data source table columns The link between a field of the federated table and a field of the source table is defined using details previously captured in step 208 of the process flow of FIG. 2.

FIG. 4 shows repetition of the previous two steps to create mapping rules of federated tables which were created in the step 210d.

Step 210g of FIG. 4 shows activation of the mapping rules. Details to achieve this step are mentioned in the XML file.

FIG. 4 shows repetition of the previous steps 210d-210g to create the federated tables of the MSU.

FIG. 4 shows repetition of the previous steps 210a-210g to create the projects in the MSU.

Example

A specific example is now described in connection with upgrading of a SAP Business Objects version 3.x enterprise solution available from SAP AG of Walldorf, Germany, to a SAP Business Objects version 4.x enterprise solution. In particular, the versions 3.x describe a single-source universe environment featuring a data federator that stores data for reports in the form of one or more target tables.

Figure 5:
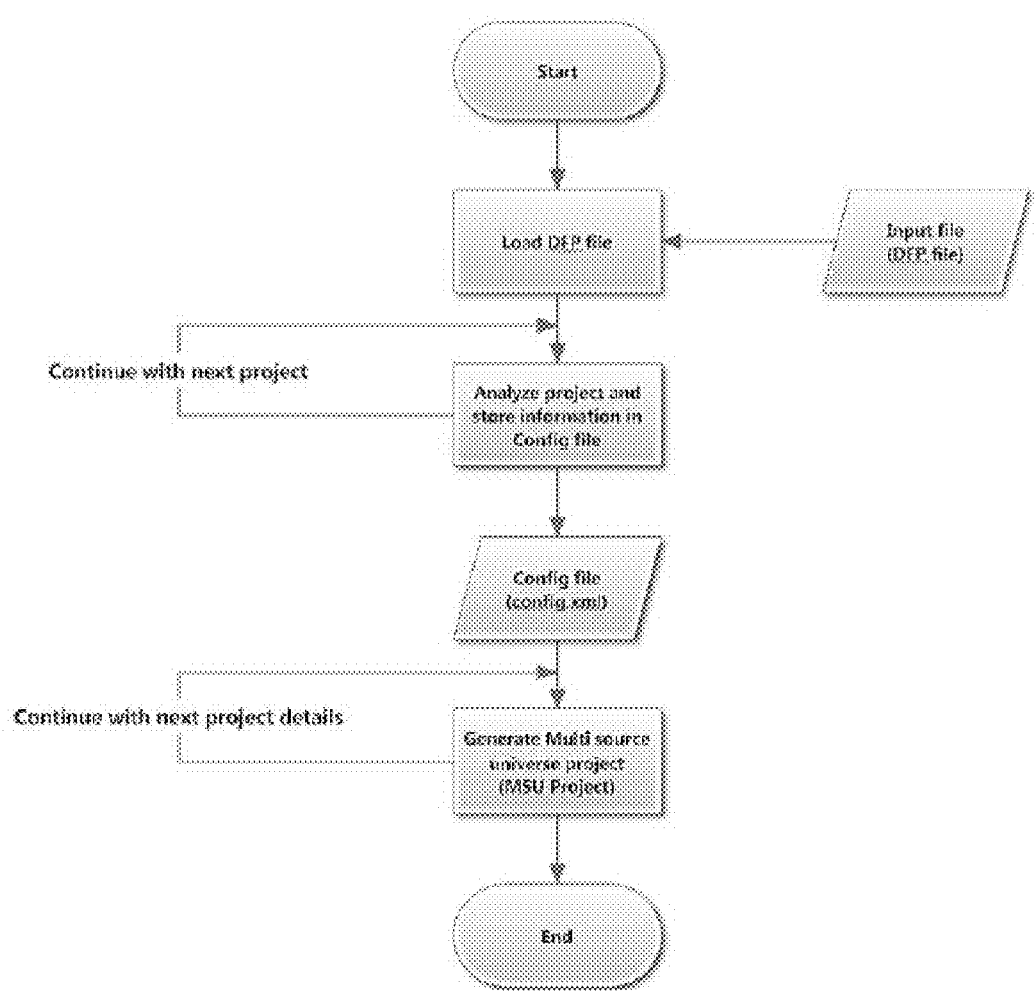
FIG. 5 shows a simplified flow diagram providing an overview of a migration process according to an embodiment.
Figure 5A:
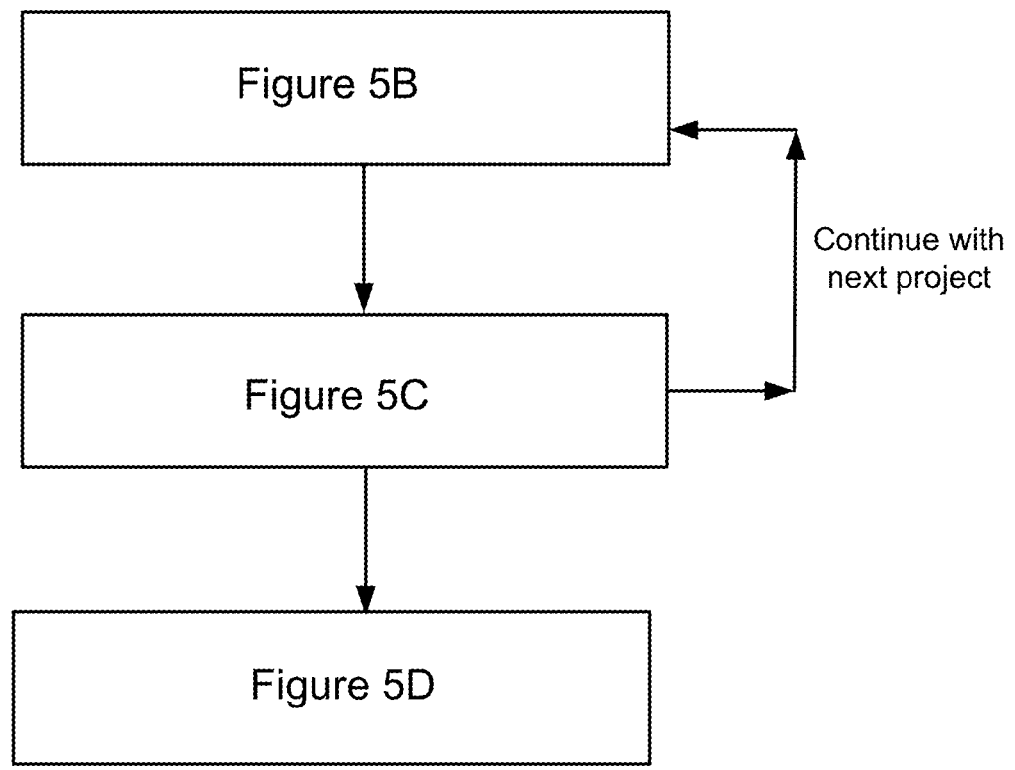
Figure 5B:
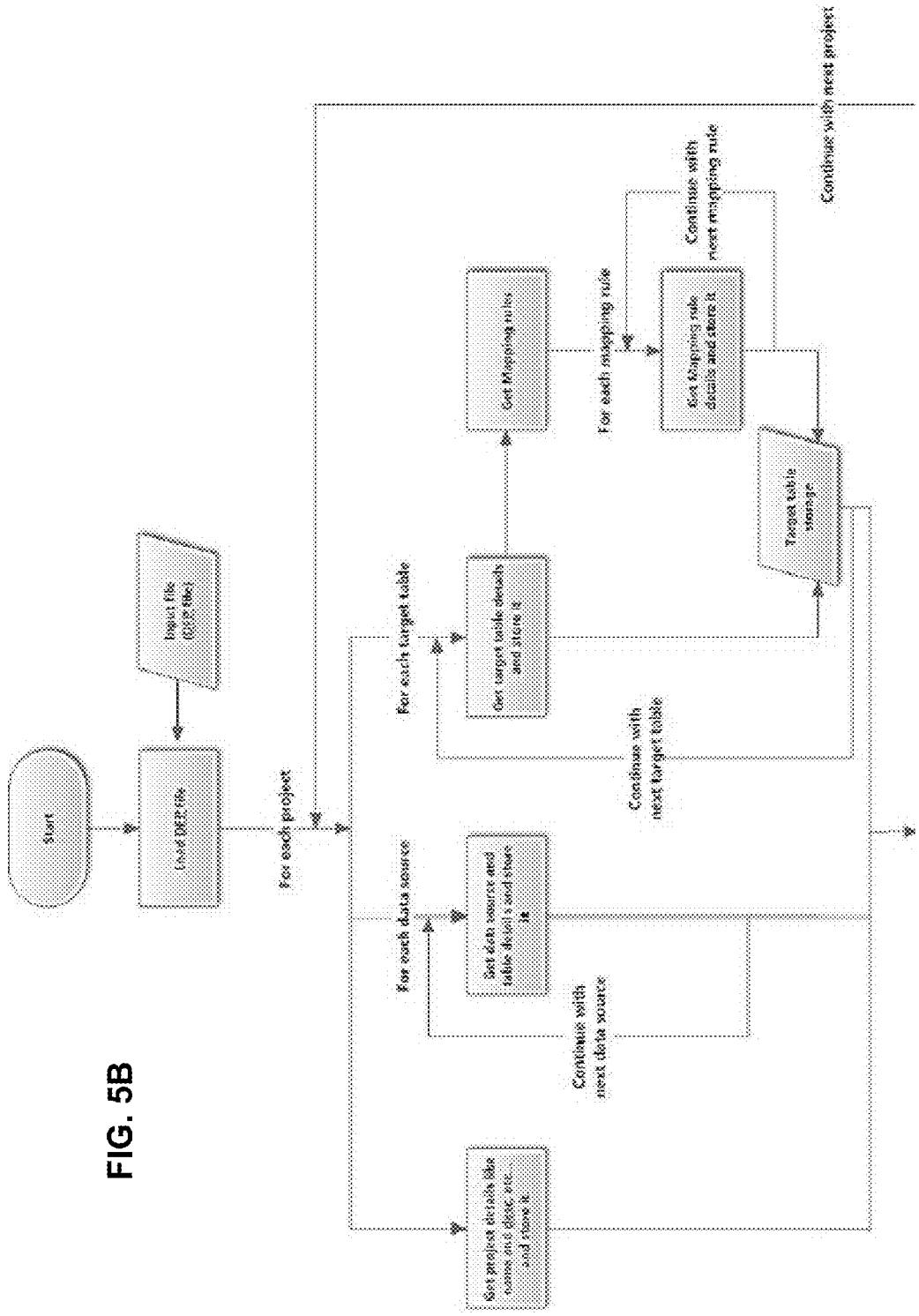
Figure 5D:
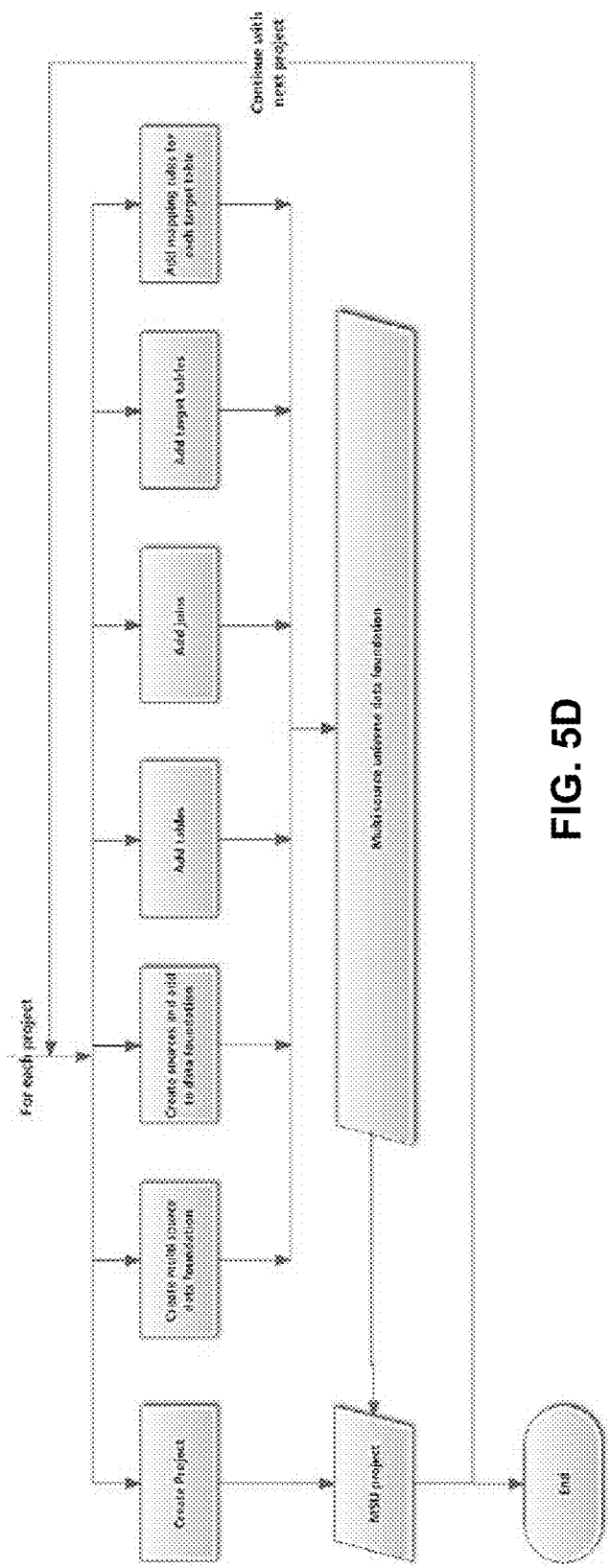

By contrast, the versions 4.x describe a multi-source universe environment storing the data from a plurality of data federators of the single source universes. FIG. 5 shows a simplified flow diagram providing an overview of a migration process according to an embodiment. FIGS. 5A-5D show a more detailed view of the process of FIG. 5.

Accordingly, by using a SAP BusinessObjects Enterprise (BOE) version 4.1 SP2 or above, one or more of the following mappings may be defined between an IDT project of the multi-source universe, and an original project of the Data Federator (DF) of the single-source universe.

One mapping is of the DF project name to the corresponding IDT project name. Another mapping is of the DF project description to the corresponding IDT project description.

Another mapping is of the DF data source name to the corresponding IDT connection name. Yet another mapping is of the DF data source description to the IDT connection description.

Still another mapping is of the DF data source through Java Database Connectivity (JDBC) driver (direct connection), to the corresponding IDT relational connection using JDBC network layer (through connection server).

Another mapping is of the DF data source through connection server, to the IDT relational connection through connection server.

Another mapping is of the BusinessWeaver (BW) data source available from SAP AG, from the DF to the corresponding BW data source from Server (.cns).

Another mapping is of the DF non-relational data sources like CSV, XML and Web service, to the corresponding IDT non-relational connections through connection server.

Another mapping is of the DF target table name to the corresponding IDT federated table name. Still another mapping is of the DF target table description to the corresponding IDT federated table description.

Another mapping is of the number of columns in the DF target table→number of columns in IDT federated table.

Still other mappings are listed as follows:

DF target table column name→IDT Federated table column name

DF target table column type→IDT Federated table column type

DF target table column description→IDT Federated table column description

Number of mapping rules in DF target table→number of mapping rules in IDT Federated table DF target table mapping rule name→IDT Federated table mapping rule name DF target table mapping rule description→IDT Federated table mapping rule description Data source tables in the DF target table mapping rule→connection tables in the IDT federated table mapping rule Data source table relations in DF mapping rule→data source table relations in IDT federated table mapping rule Link between data source table columns and target table column→link between connector table columns and federated table column DF functions→Functions used in the federation layer In summary, utilization of report conversion according to various embodiments may offer one or more benefits. For example, embodiments may allow entities to harmonize their existing single-source reporting landscapes. This can reduce maintenance cost.

Moreover, embodiments leverage off of a previous investment made to design the complex target tables of a data federator for varied business logic. This reuse of previous effort further reduces the cost of migrating to a multi-source database universe.

Furthermore, embodiments facilitate migration of projects to the multi-source database universe by creating a similar projects and federated tables to achieve similar functionality. The automatic migration avoids the effort of redesigning the universe from scratch, allowing re-use of the same reports with only minor changes (like pointing to new multi-source universe).

Figure 6:
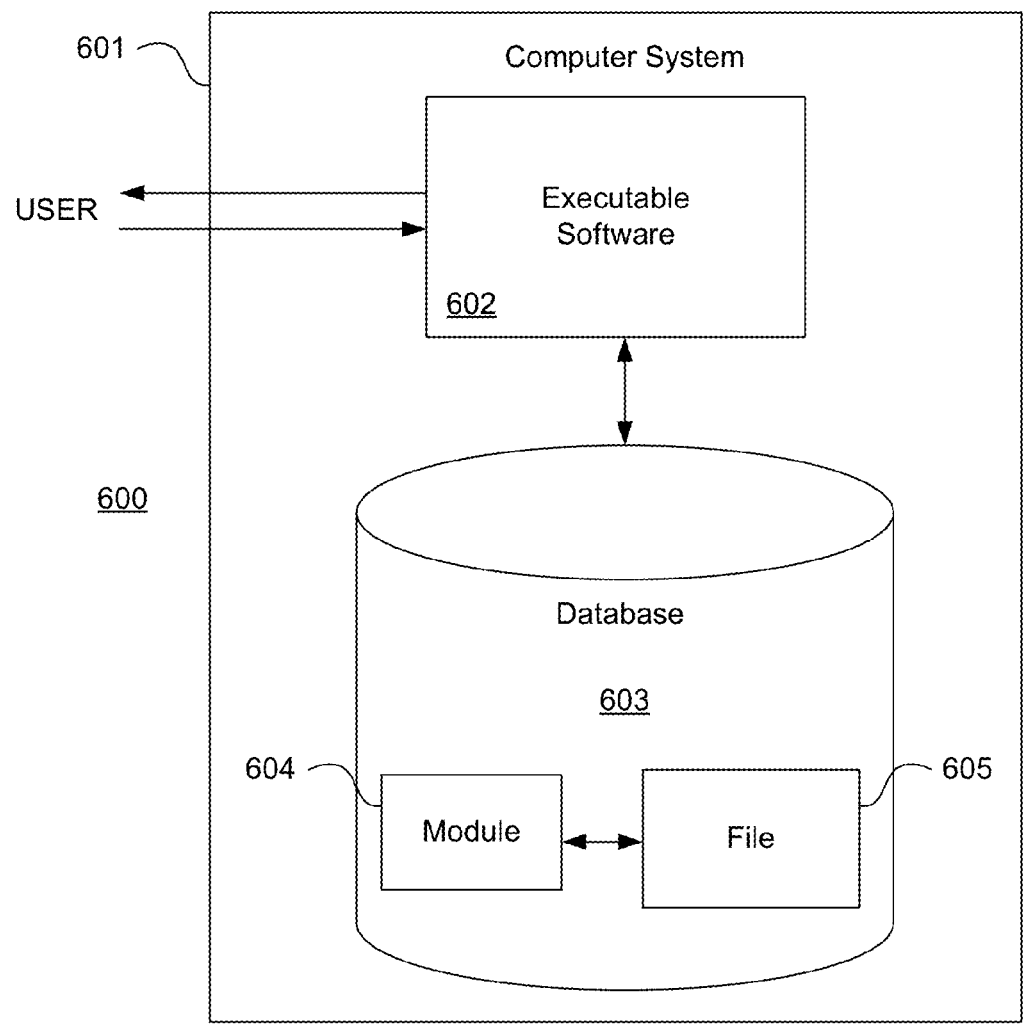
FIG. 6 illustrates hardware of a special purpose computing machine configured to perform universe conversion according to an embodiment.

FIG. 6 illustrates hardware of a special purpose computing machine configured to convert data objects from a single-source database environment to a multi-source database environment according to an embodiment. In particular, computer system 600 comprises a computer system 601 including a processor 602 that is in electronic communication with a non-transitory computer-readable storage medium 603. This computer-readable storage medium has stored thereon code 605 corresponding to a stored file (e.g., XML file). Code 604 corresponds to an analytics module. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
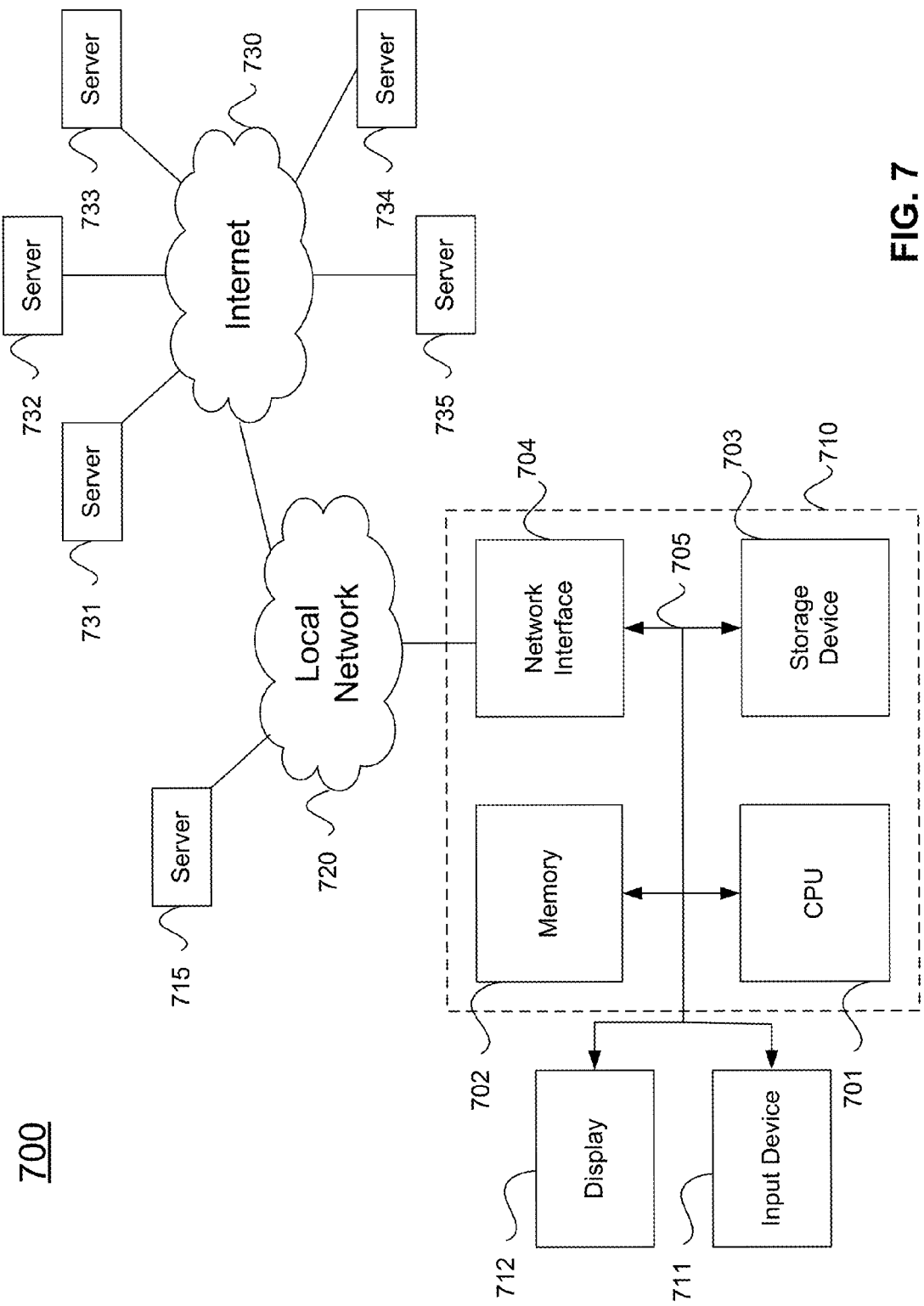
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 804 coupled with bus 805. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    causing an analytics module to receive first project data comprising a first target table stored in a data federator;
    causing the analytics module to analyze the first project data and identify a first detail comprising a first mapping between the first target table and data of a first source;
    causing the analytics module to create a first project as a first federated table in a federator layer of an information design tool;
    causing the analytics module to save the first detail in a file; and
    causing the analytics module to reference the file to automatically create a multi-source database universe including the information design tool, the first source, and a first mapping rule between the first federated table and the first source.

2. A method as in claim 1 further comprising:
    causing the analytics module to analyze the first project data and identify a second detail comprising a second mapping between the first target table and data of the first source;
    causing the analytics module to save the second detail in the file; and
    causing the analytics module to reference the file to create in the multi-source database universe a second mapping rule between the first federated table and the first source.

3. A method as in claim 1 further comprising:
    causing the analytics module to analyze the first project data and identify second detail comprising a second mapping between a second target table and data of a first source;
    causing the analytics module to create a second federated table in the federator layer;
    causing the analytics module to save the second detail in the file; and
    causing the analytics module to reference the file to create in the multi-source database universe a second mapping rule between the second federated table and the first source.

4. A method as in claim 1 further comprising:
    causing the analytics module to receive second project data comprising a second target table stored in the data federator;
    causing the analytics module to analyze the second project data and identify a second detail comprising a second mapping between the second target table and data of a first source;
    causing the analytics module to create a second project as a second federated table in the federator layer of the information design tool;
    causing the analytics module to save the second detail in the file; and
    causing the analytics module to reference the file to create in the multi-source database universe a second mapping rule between the second federated table and the first source.

5. A method as in claim 1 further comprising:
    causing the analytics module to receive second project data comprising a second target table stored in different data federator;
    causing the analytics module to analyze the second project data and identify a second detail comprising a second mapping between the second target table and data of a second source;
    causing the analytics module to create a second project as a second federated table in the federator layer of the information design tool;
    causing the analytics module to save the second detail in the file; and
    causing the analytics module to reference the file to create in the multi-source database universe the second source and second mapping rule between the second federated table and the second source.

6. A method as in claim 5 further comprising displaying the first source in a color different from the second source.

7. A method as in claim 1 wherein the analytics module analyzes the first project data by establishing a connection with a data objects repository.

8. A method as in claim 1 wherein the file comprises an XML file.

9. A non-transitory computer readable storage medium embodying a computer program for performing a method, said method comprising:
- causing an analytics module to receive first project data comprising a first target table stored in a data federator;
- causing the analytics module to analyze the first project data and identify a first detail comprising a first mapping between the first target table and data of a first source;
- causing the analytics module to create a first project as a first federated table in a federator layer of an information design tool;
- causing the analytics module to save the first detail in a file;
- causing the analytics module to reference the file to automatically create a multi-source database universe including the information design tool, the first source, and a first mapping rule between the first federated table and the first source;
- causing the analytics module to analyze the first project data and identify a second detail comprising a second mapping between the first target table and data of the first source;
- causing the analytics module to save the second detail in the file; and
- causing the analytics module to reference the file to create in the multi-source database universe a second mapping rule between the first federated table and the first source.

10. A non-transitory computer readable storage medium as in claim 9 wherein the method further comprises:
- causing the analytics module to analyze the first project data and identify a third detail comprising a third mapping between a second target table and data of a first source;
- causing the analytics module to create a third federated table in the federator layer;
- causing the analytics module to save the third detail in the file; and
- causing the analytics module to reference the file to create in the multi-source database universe a third mapping rule between the second federated table and the first source.

11. A non-transitory computer readable storage medium as in claim 9 wherein the method further comprises:
- causing the analytics module to receive second project data comprising a second target table stored in the data federator;
- causing the analytics module to analyze the second project data and identify a third detail comprising a second mapping between the second target table and data of a first source;
- causing the analytics module to create a second project as a second federated table in the federator layer of the information design tool;
- causing the analytics module to save the third detail in the file; and
- causing the analytics module to reference the file to create in the multi-source database universe a third mapping rule between the second federated table and the first source.

12. A non-transitory computer readable storage medium as in claim 9 wherein the method further comprises:
- causing the analytics module to receive second project data comprising a second target table stored in different data federator;
- causing the analytics module to analyze the second project data and identify a third detail comprising a second mapping between the second target table and data of a second source;
- causing the analytics module to create a second project as a second federated table in the federator layer of the information design tool;
- causing the analytics module to save the third detail in the file; and
- causing the analytics module to reference the file to create in the multi-source database universe the second source and a third mapping rule between the second federated table and the second source.

13. A non-transitory computer readable storage medium as in claim 12 wherein the method further comprises displaying the first source in a color different from the second source.

14. A non-transitory computer readable storage medium as in claim 9 wherein the analytics module analyzes the first project data by establishing a connection with a data objects repository.

15. A non-transitory computer readable storage medium as in claim 9 wherein the file comprises an XML file.

16. A computer system comprising:
- one or more processors;
- a software program, executable on said computer system, the software program configured to:
- cause an analytics module to receive first project data comprising a first target table stored in a data federator;
- cause the analytics module to analyze the first project data and identify a first detail comprising a first mapping between the first target table and data of a first source;
- cause the analytics module to create a first project as a first federated table in a federator layer of an information design tool;
- cause the analytics module to save the first detail in an XML file;
- cause the analytics module to reference the XML file to automatically create a multi-source database universe including the information design tool, the first source, and a first mapping rule between the first federated table and the first source;
- cause the analytics module to analyze the first project data and identify a second detail comprising a second mapping between the first target table and data of the first source;
- cause the analytics module to save the second detail in the XML file; and
- cause the analytics module to reference the XML file to create in the multi-source database universe a second mapping rule between the first federated table and the first source.

17. A computer system as in claim 16 wherein the computer program is further configured to:
- cause the analytics module to analyze the first project data and identify a third detail comprising a third mapping between a second target table and data of a first source;
- cause the analytics module to create a third federated table in the federator layer;
- cause the analytics module to save the third detail in the XML file; and cause the analytics module to reference the XML file to create in the multi-source database universe a third mapping rule between the second federated table and the first source.

18. A computer system as in claim 16 wherein the computer program is further configured to:
   cause the analytics module to receive second project data comprising a second target table stored in the data federator;
   cause the analytics module to analyze the second project data and identify a third detail comprising a second mapping between the second target table and data of a first source;
   cause the analytics module to create a second project as a second federated table in the federator layer of the information design tool;
   cause the analytics module to save the third detail in the XML file; and
   cause the analytics module to reference the XML file to create in the multi-source database universe a third mapping rule between the second federated table and the first source.

19. A computer system as in claim 16 wherein the computer program is further configured to:
   cause the analytics module to receive second project data comprising a second target table stored in different data federator;
   cause the analytics module to analyze the second project data and identify a third detail comprising a second mapping between the second target table and data of a second source;
   cause the analytics module to create a second project as a second federated table in the federator layer of the information design tool;
   cause the analytics module to save the third detail in the XML file; and
   cause the analytics module to reference the XML file to create in the multi-source database universe the second source and a third mapping rule between the second federated table and the second source.

20. A computer system as in claim 19 wherein the computer program is further configured to display the first source in a color different from the second source.

* * * * *